(12) United States Patent
Kolb et al.

(10) Patent No.: US 7,203,630 B2
(45) Date of Patent: Apr. 10, 2007

(54) AIRCRAFT FLIGHT DATA MANAGEMENT SYSTEM

(75) Inventors: Kurt Kolb, Calgary (CA); Kent Jacobs, Calgary (CA); Darryl Jacobs, Calgary (CA)

(73) Assignee: Aeromechanical Services Ltd., Calgary, Alberta (CA)

( * ) Notice: Subject to any disclaimer, the term of this patent is extended or adjusted under 35 U.S.C. 154(b) by 398 days.

(21) Appl. No.: 10/605,962

(22) Filed: Nov. 10, 2003

(65) Prior Publication Data

US 2004/0260777 A1 Dec. 23, 2004

Related U.S. Application Data

(60) Provisional application No. 60/319,687, filed on Nov. 11, 2002.

(51) Int. Cl.
G06G 7/48 (2006.01)

(52) U.S. Cl. .......................................................... 703/6
(58) Field of Classification Search ..................... 703/6
See application file for complete search history.

(56) References Cited

U.S. PATENT DOCUMENTS

| | | | | |
|---|---|---|---|---|
| 4,644,494 A * | 2/1987 | Muller | .......................... | 711/152 |
| 5,890,079 A | 3/1999 | Levine | .......................... | 701/14 |
| 5,974,349 A | 10/1999 | Levine | .......................... | 701/14 |
| 6,047,165 A | 4/2000 | Wright et al. | ................. | 455/66 |
| 6,092,008 A * | 7/2000 | Bateman | ....................... | 701/14 |
| 6,104,914 A | 8/2000 | Wright et al. | ................. | 455/66 |
| 6,108,523 A | 8/2000 | Wright et al. | ................. | 455/66 |
| 6,148,179 A | 11/2000 | Wright et al. | ................. | 455/66 |
| 6,154,636 A | 11/2000 | Wright et al. | ................. | 455/66 |
| 6,154,637 A | 11/2000 | Wright et al. | ................. | 455/66 |
| 6,160,998 A | 12/2000 | Wright et al. | ................. | 455/66 |
| 6,163,681 A | 12/2000 | Wright et al. | ................. | 455/66 |
| 6,167,238 A | 12/2000 | Wright | ........................ | 455/66 |
| 6,167,239 A | 12/2000 | Wright et al. | ................. | 455/66 |
| 6,173,159 B1 | 1/2001 | Wright et al. | ................. | 455/66 |
| 6,181,990 B1 | 1/2001 | Grabowsky et al. | .......... | 701/14 |
| 6,249,913 B1 * | 6/2001 | Galipeau et al. | .............. | 725/76 |
| 6,278,913 B1 | 8/2001 | Jiang | ............................ | 701/3 |
| 6,308,044 B1 | 10/2001 | Wright et al. | ................. | 455/66 |
| 6,308,045 B1 | 10/2001 | Wright et al. | ................. | 455/66 |
| 6,799,094 B1 | 9/2004 | Vaida et al. | ................... | 701/3 |
| 2001/0036822 A1 * | 11/2001 | Mead et al. | ................ | 455/414 |

OTHER PUBLICATIONS

Levine. S: "The remote aircraft flight recorder and advisory telemetry system-RAFT (patient pending) and its application to unifying the total digital avionics system" Digital Avionics System Conference, 1998.

* cited by examiner

Primary Examiner—Hugh Jones
(74) Attorney, Agent, or Firm—Bennett Jones LLP

(57) ABSTRACT

A flight data collection and transmission system includes a data interface for receiving digital flight data, means for formatting the data as a binary or text file, means for incorporating the data file into an email, means for transmitting the email using a communication system. A method of collecting and transmitting aircraft data includes the steps of receiving and storing digital flight data, creating a data file and transmitting the data as part of an email upon the happening of a defined event.

10 Claims, 8 Drawing Sheets

| Flight Data Report | |
|---|---|
| Registration | C-TIME |
| S/N | 100 |
| Date | 14 September 2000  08:22:32 UTC |
| Location | N 53 40 09  W 113 28 32 |
| | |
| Startup Location | N 51 06 50  W 114 01 13 |
| Time at Startup | 07:15:08 UTC |
| Time Airborne | 07:22:15 UTC |
| Time Touchdown | 08:12:23 UTC |
| Time at Shutdown | 08:22:12 UTC |
| Shutdown Location | N 53 40 09  W 113 28 32 |
| | |
| Air Time | 00:50:08 |
| Block Time | 01:06:57 |
| | |
| Block Fuel Usage | 826 lbs |
| | |
| APU Start Time | 07:02:14 UTC |
| | 07:02:58 UTC |
| APU Run Time | 00:15:43 |

| | | |
|---|---|---|
| Engine Start Time | 07:17:14 UTC | 07:15:08 UTC |
| Engine Shutdown Time | 08:22:12 UTC | 08:22:11 UTC |
| Engine Elapsed Time | 01:04:58 | 01:06:57 |
| | | |
| Over Temperature | -- | -- |
| Over Torque | -- | -- |
| Reduced Power T/O | --% | --% |

FIG. 6

Engine Trend Data Report

Registration .................... C-TIME
S/N ................................ 100
Date ............................. 14 September 2000  08:22:32 UTC
Location ........................ N 53 40 09  W 113 28 32

|  | #1 | #2 |
|---|---|---|
| Altitude | 18,000 | 18,000 |
| Airspeed | 198 | 198 |
| Outside Air.Temp | -21°C | -21°C |
| Propeller.RPM | 1050 | 1050 |
| Propeller.Torque | 74% | 74% |
| $N_{HP}$ RPM | 29,887 | 29,967 |
| $N_{LP}$ RPM | 24,376 | 24,380 |
| ITT | 734°C | 742°C |
| Fuel Flow | 450 | 461 |

FIG. 7

AIRCRAFT FLIGHT DATA MANAGEMENT SYSTEM

CROSS REFERENCE TO RELATED APPLICATIONS

This application claims the priority of U.S. provisional patent application 60/319,687 filed on Nov. 11, 2002.

BACKGROUND OF INVENTION

The present invention relates to an aircraft flight data management system and, more particularly, to an on-board data acquisition, storage and transmission system.

It is common for aircraft to generate records of operational and performance data for each flight of the aircraft. The data are utilized in the event of an accident or an incident and to assist in maintenance of the aircraft by detecting faulty components or gradual deterioration of a system or component. The data may also be used to improve efficiency of the operation, to optimize aircraft utilization, to assist in reviewing crew performance, and to assist in logistical planning activities such as scheduling and routing.

Aircraft data are typically gathered by a digital flight data acquisition unit (DFDAU). The DFDAU is the interface unit between all of the aircraft sensors and data buses and the flight data recorder (FDR) which stores the data on magnetic or magnetic-optical media on older aircraft. Newer aircraft utilize digital solid-state memory media. When the aircraft lands, ground personnel board the aircraft, remove the media or download the data from memory, and physically mail the media to a flight operations center (FOC). The manual removal and posting of the data adds a significant labor cost, yields less than desirable data delivery reliability, and results in a significant time delay before the data are useful for analysis.

It is known to use radio frequency (RF) transmissions to transmit data relating to an aircraft. Such teachings, however, require substantial investments to construct the RF transmission systems required for such a system to work. Furthermore, it is very expensive to create redundancy in such a system.

It is also known to transmit data relating to an aircraft via a telephone system located in a terminal. Such a system, however, requires that the aircraft be docked at the gate before transmission begins, thereby resulting in a substantial delay in the transmission. Furthermore, such a system requires an added step of transmitting the data from the aircraft to the terminal telephone system, increasing the cost of installing, operating, and maintaining such a system.

In another prior art system, described in U.S. Pat. No. 6,181,990, aircraft data is recorded and transmitted using a cellular telephony infrastructure. The system is designed to transmit all digitally recorded flight data as a single file which may typically include 40 megabytes of data. A compression utility is included to reduce the size of the file being transmitted and to reduce transmission time. The data may be encrypted. The data is processed into datagrams which are assembled into UDP/IP packets, transmitted over a cellular communications system, and received at a flight operations centre, where the packets are reassembled, decompressed and unencrypted. This system is unwieldy because of the volume of data being transmitted and because cellular data transmission may result in significant data loss.

Thus, there is a need in the art for an aircraft data transmission system that reliably and automatically transfers pertinent flight data from an aircraft to a remote location with little or no human involvement.

SUMMARY OF INVENTION

The present invention provides an improved system for capturing, recording and transmitting aircraft data from an aircraft to a ground-based station. Therefore, in one aspect, the invention comprises an aircraft data transmission system comprising:
  (a) means for monitoring and collecting aircraft data;
  (b) means for formatting the data or a portion of the data as a binary or text file;
  (c) means for incorporating the binary or text file into an email message;
  (d) means for transmitting the email; and
  (e) communication means for carrying the email transmission to a ground station.

In another aspect, the invention may comprise a method of transmitting aircraft data from an aircraft comprising the steps of:
  (a) receiving digital flight data from an aircraft data bus or an discrete input or both;
  (b) storing the data to a flight data file;
  (c) creating a summary file upon a specified event or command;
  (d) transmitting the summary file in the form of an email or attached to an email via a radio transmitter.

In another aspect, the invention comprises an aircraft data collection and transmission system comprising:
  (a) means for monitoring aircraft data;
  (b) a rules database defining at least one aircraft data condition and a related action;
  (c) means for comparing the aircraft data to the rules database; and
  (d) means for implementing the action upon the aircraft data meeting an aircraft data condition.

BRIEF DESCRIPTION OF DRAWINGS

The invention will now be described by way of an exemplary embodiment with reference to the accompanying simplified, diagrammatic, not-to-scale drawings. In the drawings:

FIG. 6 is a sample flight data report.

FIG. 7 is a sample engine trend data report.

DETAILED DESCRIPTION

The present invention provides for an aircraft data management system. When describing the present invention, all terms not defined herein have their common art-recognized meanings.

As used herein, "flight data" means a representation of any operation or performance parameter or variable which may be sensed or recorded during the operation of an aircraft. Flight data may include, without limitation, date and time, pressure, altitude, airspeed or groundspeed, vertical acceleration, magnetic heading, control-column position, rudder-pedal position, control-wheel position, horizontal stabilizer, fuel flow, photographic images, and video or audio recordings. Flight data may also include derivatives and representations of flight data.

As used herein, "email" or "electronic mail" refers to text messages transmitted from one computing device to another by means of computer networks. Email may include attachments which may include simple text (ASCII) files or computer files having proprietary formats. The structure and function of email clients and servers are well known in the art.

Figure 1:
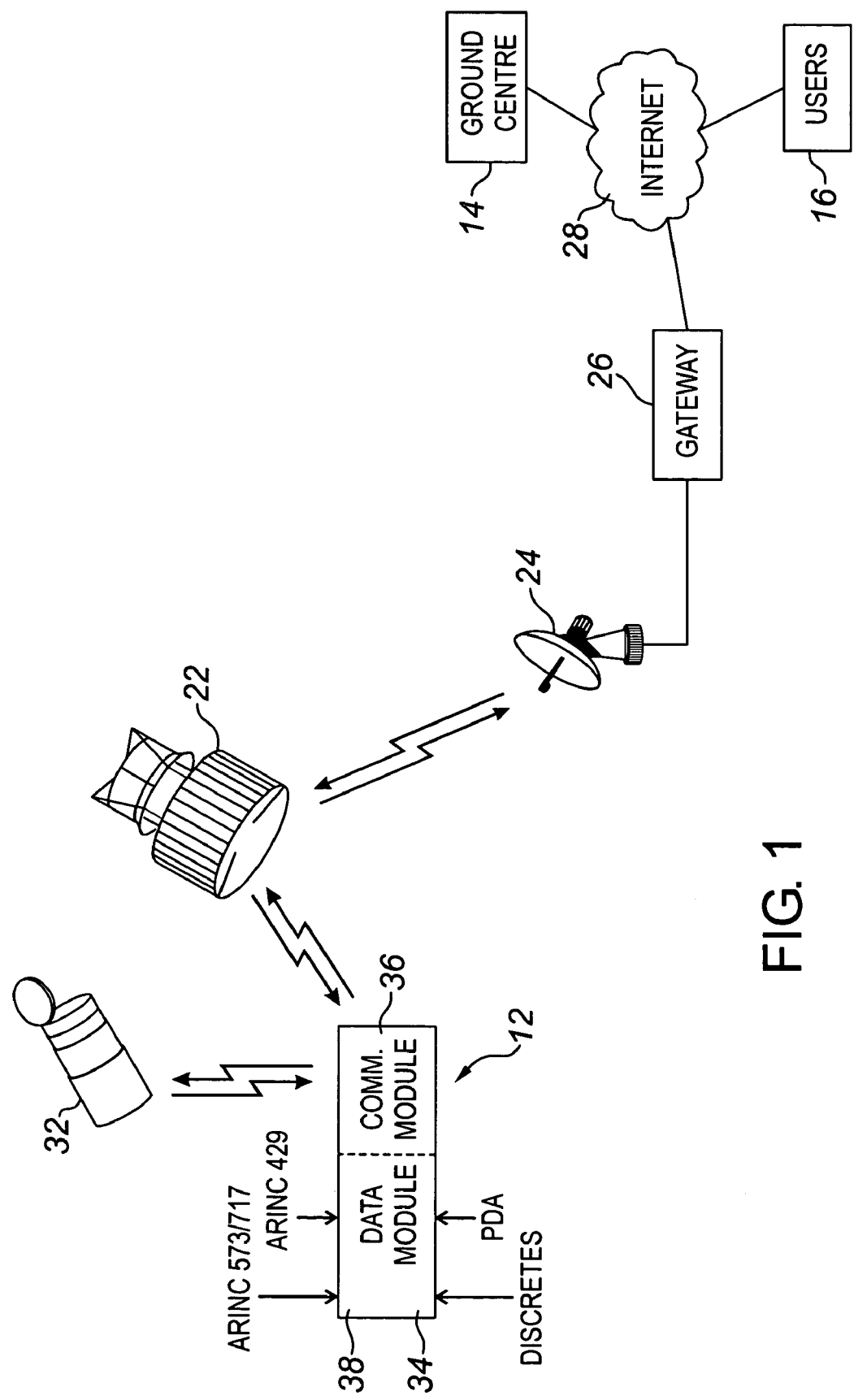
FIG. 1 is a schematic representation of one embodiment of the present invention.

In general terms, as shown in FIG. 1, a system of the present invention includes an aircraft data processing unit (12) mounted in an aircraft (10). Also related to the system is a ground station server (14) which may serve as an information portal, as well as at least one maintenance/operations workstation (16) which may be remotely located. The data processing unit (12) connects to various aircraft data buses and accumulates flight data. The server (14) captures and archives the flight data and may preferably provide data reports to users of the system. A user, through the maintenance/operations workstation (16), may query and mine the data using tools comprising data analysis software included in the interface.

Figure 2:
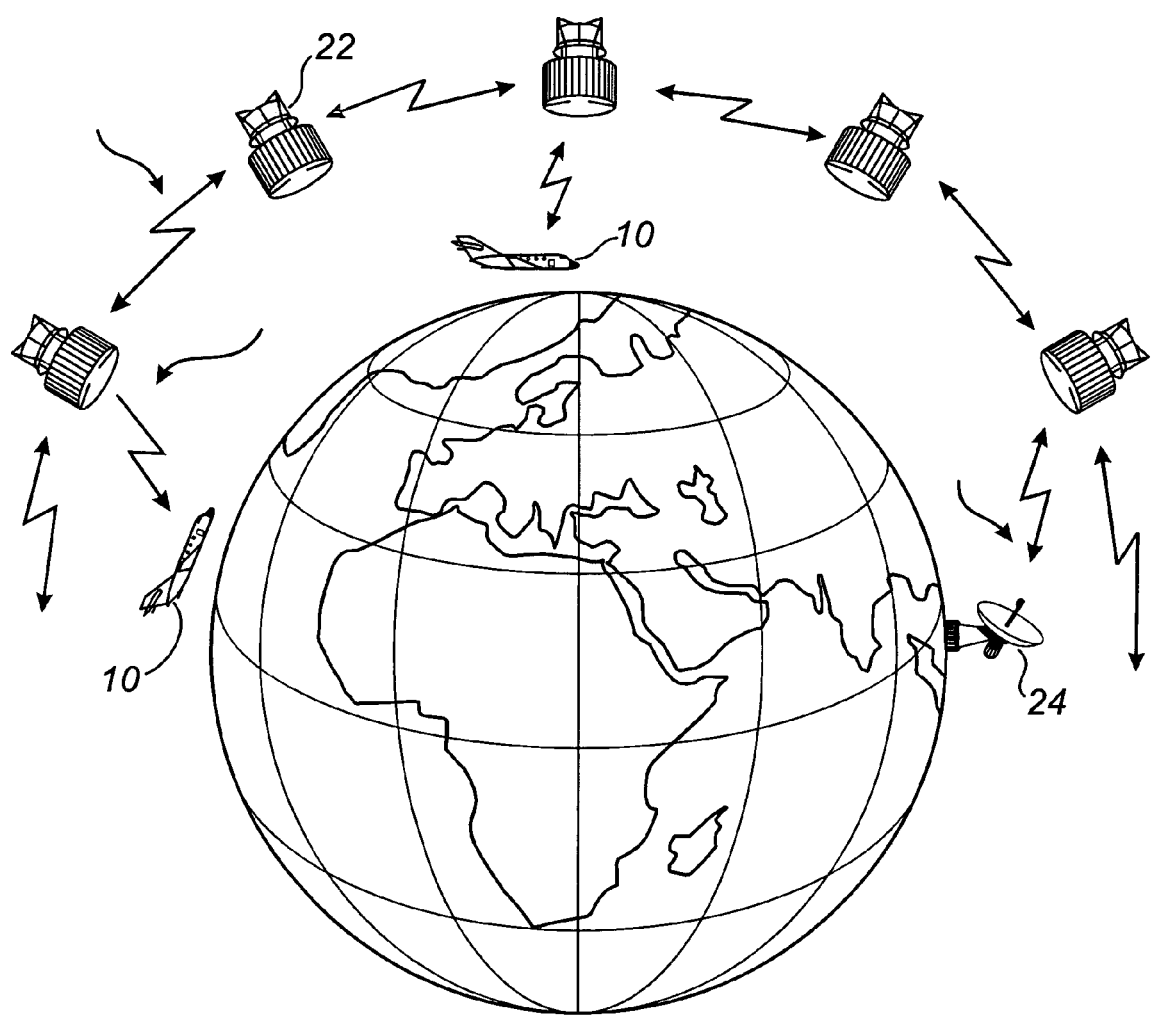
FIG. 2 is a schematic representation of a satellite constellation used in one embodiment of the present invention.

In one embodiment, as illustrated in FIG. 2, the method of communication between the data processing unit (12) and the remote server (14) includes a satellite link system employing a satellite modem (18) included in a communications module (36) which is part of the data unit (12), a constellation of satellites (22), to a ground satellite receiver (24), which links to a gateway (26) and the Internet (28) or other computer network. The satellite constellation may be either a plurality of geosynchronous satellites or low earth orbit satellites.

In one embodiment, a global positioning system (GPS) receiver (30) is included as part of the communications module (36). As is well known in the art, the GPS receiver (30) receives radio signals from GPS satellites (32) and calculates the position and altitude of the aircraft (10) which is provided as flight data to the data processing unit (12).

In one embodiment, the data processing unit (12) includes three physical modules. A data acquisition module (34) is the primary interface to the aircraft systems. A communication module (36) includes a communication device (18) such as satellite or cellular modem and a radio transceiver. A control module (38) controls the data acquisition and communication module and processes and stores flight data. The unit also includes a power supply unit (40) which accepts aircraft power and, if necessary, transforms it to lower voltages to supply to the data acquisition unit's circuits. Conventional aircraft power is 28 VDC.

In one embodiment, the power unit (40) is combined with the data acquisition module (34) and provides both 12 VDC and 3.3 VDC to the components of the data processing unit (12). The power unit (40) may connect to any switched aircraft bus (not shown). Optionally, a second 28 VDC input connected to the aircraft hot bus (not shown) can provide a backup power source in case the aircraft powers down during a data manipulation or transmission step. The second input may be configured to timeout after a set period of time to prevent draining the aircraft batteries.

The data acquisition module includes at least one data reader module (42) which interfaces to the aircraft's flight data recorder bus. Preferably, the data reader modules are capable of reading data in standard civilian formats such as ARINC 573 or 717 formats, and ARINC 429 used for communication between existing avionics units, which are well known in the art. Other data formats may be implemented such as military standards or proprietary formats. Additionally, the unit may include discrete input modules (44, 46). As used herein, a discrete input is any input from a source which is not part of an existing data bus. Examples of a discrete input may include cabin door switches, individual gauges or control items such as the lowering and raising of flaps. As well, a preferred embodiment may include a serial port interface (48) to permit connection of a computing device such as a laptop computer, a handheld or tablet computer, or a personal digital assistant (PDA). In one embodiment, a RS-422, or a RS 232, or a RS 422 with a RS 232 adapter interface is provided to permit connection to a PDA.

An aircraft identification plug (50) provides an identifier signal which is unique to the aircraft. The identifier signal may include information regarding the make, model and series of the aircraft as well as a serial number or other information which identifies the specific aircraft involved.

The communication module (36), besides including a satellite modem (18) or other communications device, may also include a GPS receiver (30) for use in instances where the aircraft does not have a GPS receiver. In a preferred embodiment, the communication module incorporates a satellite modem which includes a GPS receiver. Suitable satellite modems are commercially available, including a Magellan OM-200™ Stellar™ modems, or a Quake Global Q1500™ satellite modem. The specific mode of communication implemented by the communication module is not essential to the present invention. A UHF satellite system is currently preferred because of the global coverage which is provided by a satellite system. However, if cellular coverage is present, the present invention may utilize cellular telephony as the communication mode between the data processing unit (12) and the ground server (14). As well, VHF and HF radio transceivers may also be used. The data acquisition module (34) and the communications module (36) both communicate with the data storage and control module (38) which serves as the primary controller for the data acquisition unit (12). It is configured to control and monitor the data acquisition module, perform any necessary computations or conversions, format data into reports, and store reports and raw data into memory. The data storage and control module further communicates with and controls the GPS and communications module, described below, to process location information and transmit reports and data.

Figure 3:
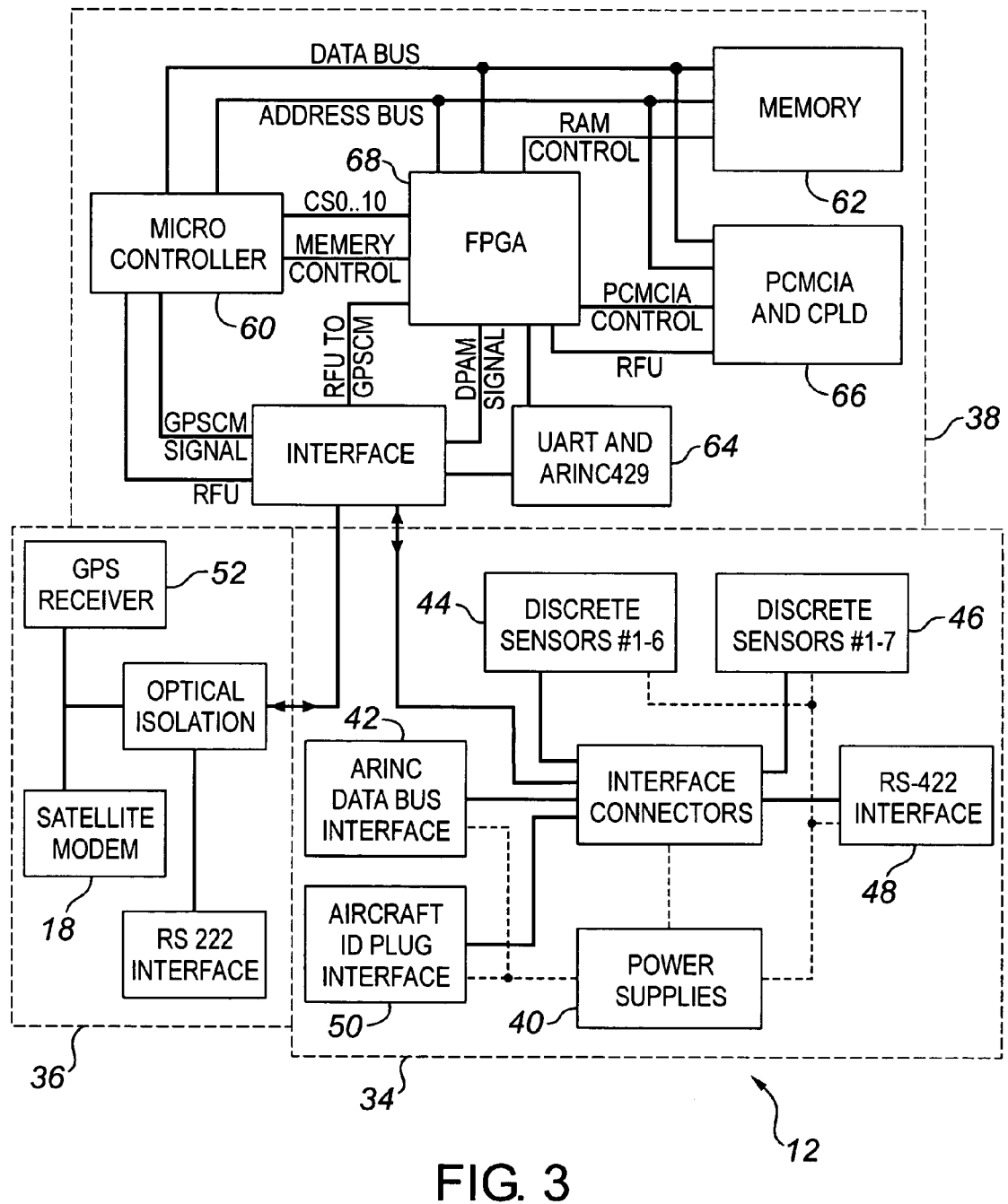
FIG. 3 is a block diagram of one embodiment of a data processing unit.

In one embodiment shown in FIG. 3, a microprocessor subsystem includes a processing unit (60) with non-volatile read-only memory and random-access memory (62). A logic device (64) provides additional memory and a peripheral decoding circuit. Another logic device (66) provide buffering and connection to an external memory card, such as a Compact Flash™ memory or other similar memory cards. An field programmable gate array (FPGA) (68) provides ARINC bus information decoding information for the processor (60). A maintenance access port (70) is an external serial interface used for software updates and data transfer. In one embodiment, the maintenance access port may include a standard RS 232 port as well as a port which is selectable between RS 232, RS 422 and RS 485 modes.

Figure 4:
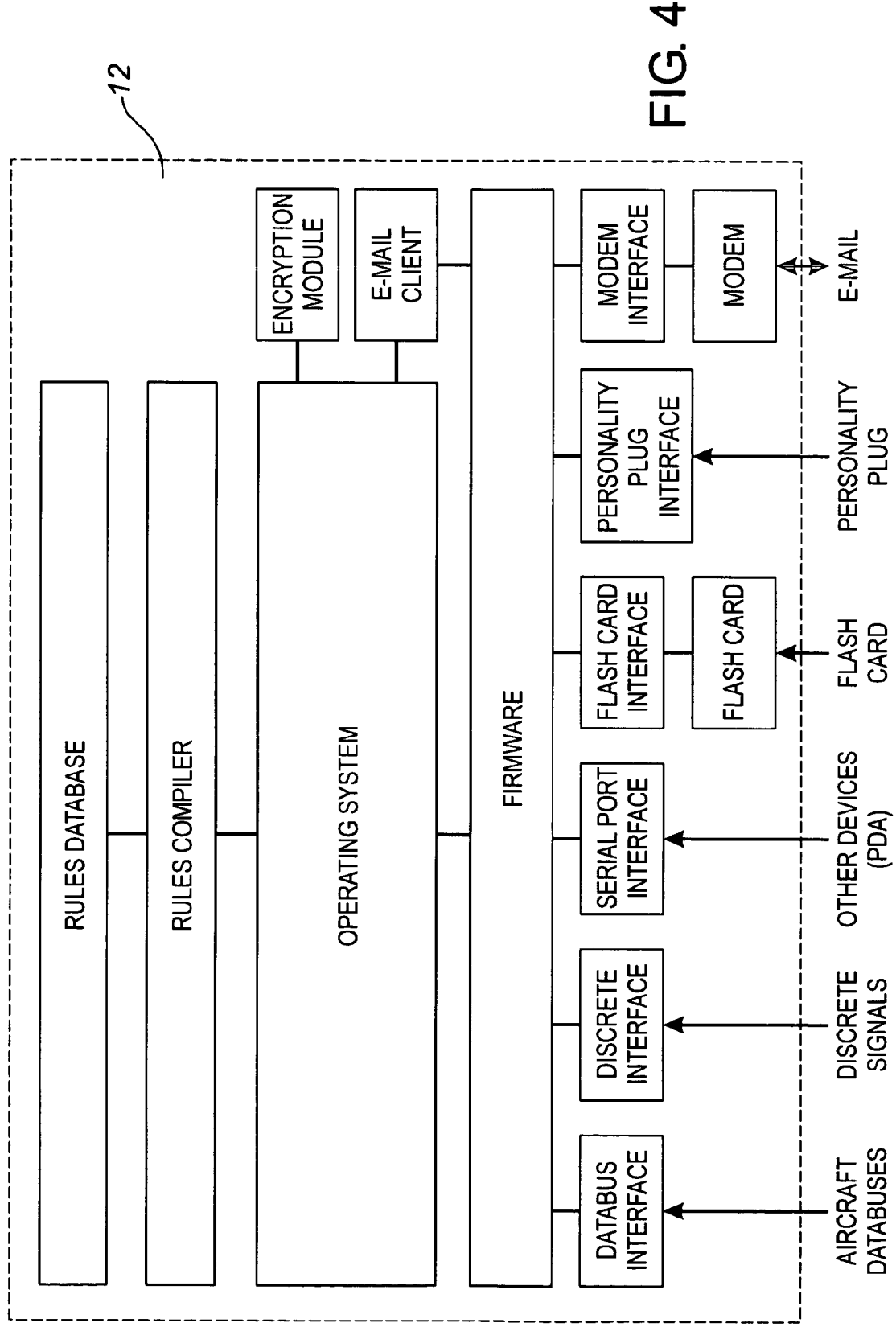
FIG. 4 is a block diagram showing functional components of one embodiment of a data processing unit.

An alternative schematic representation of the data unit (12) is shown in FIG. 4. Functionally, the unit collects data from the aircraft databuses, from discrete signals and from the aircraft identifier plug (personality plug). The information is stored in RAM memory until it is written to the non-volatile memory or used to create a summary data file which is attached to an email, or formatted as an email, and transmitted over the communications system.

The data storage and control module (38), or any of the data unit (12) modules, may be implemented by a general purpose computer programmed with appropriate software, firmware, a microprocessor or a plurality of microprocessors, programmable logic devices, or other hardware or combination of hardware and software known to those skilled in the art. The block diagrams of the modules illustrated in FIG. 3 or FIG. 4 are examples of an embodiment of the invention and are not intended to be limiting of the claimed invention in any manner.

Figure 5:
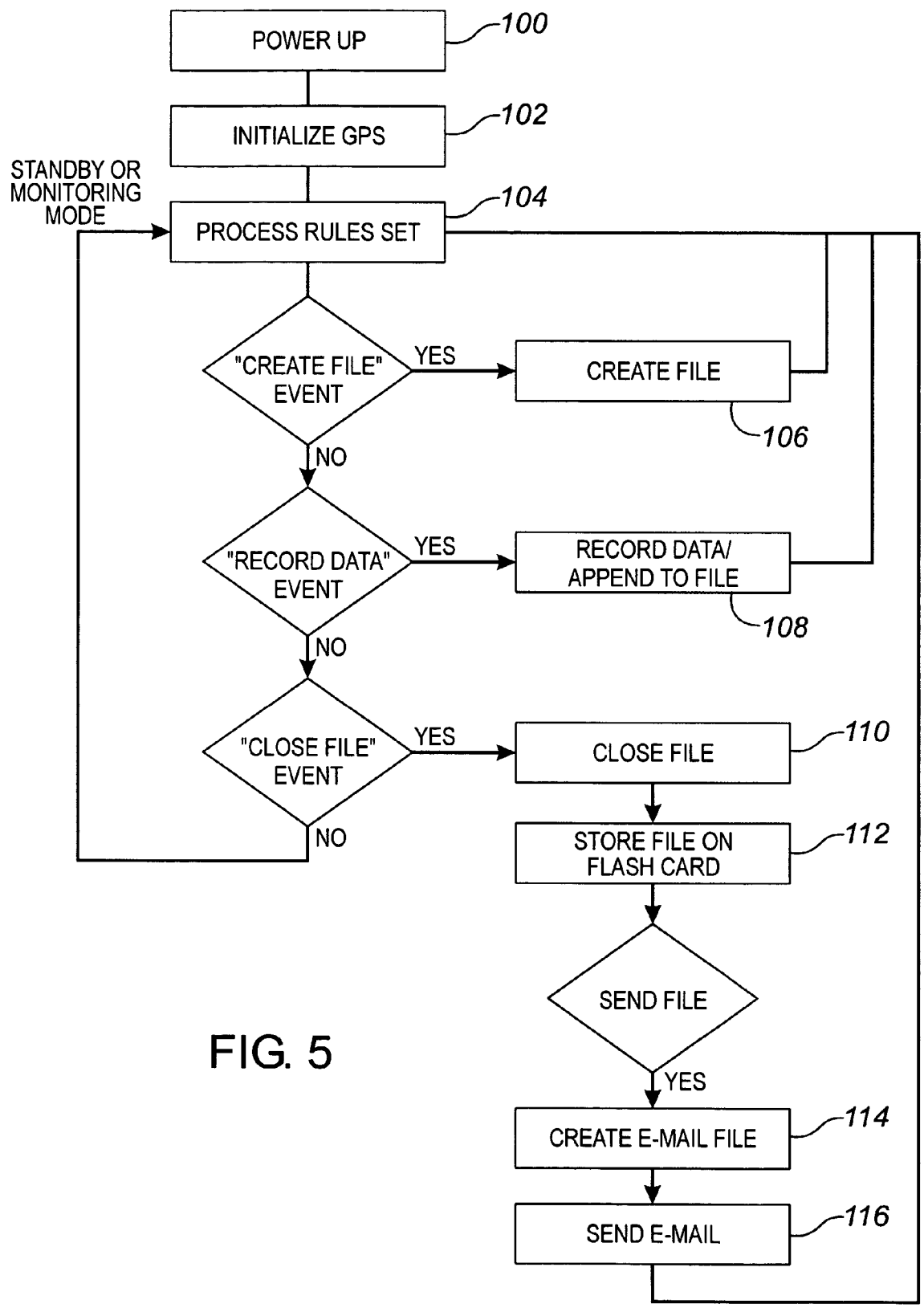
FIG. 5 is a flowchart showing one embodiment of a method of the present invention.

FIG. 5 illustrates a flowchart of a method implemented by the data unit (12) in one embodiment. When the unit powers up (100), the GPS receiver is initialized (102) and the unit goes into a standby/monitoring mode. In standby/monitoring mode, all inputs are being monitored (104) and compared to a rules database which is stored in non-volatile memory, however, no data is being recorded or stored. The rules database defines aircraft data conditions or events which trigger certain functions of the unit (12). The rules database may be stored in memory in the data storage and control module (38). For example, an event may cause the unit to create a file (106). Another event may cause the unit to begin recording data (108) to the newly created file or to append data to an existing file. Data files may include a flight data recorder file (FDR file) which includes all relevant flight data, or a summary file which includes only summary data of certain inputs. Another event may cause the unit to close the data file (110), whereupon a copy of the file may be stored on the removable memory card (112). Yet another event may signal the unit to create a summary file (114) which may then be transmitted by email (116), either immediately or at a subsequent time.

As will be apparent to one skilled in the art, the definition of the rules in the rules database enables customization of the data files to be stored and transmitted, and the data reports which can be produced and manipulated by users. For example, the rules may be configured such that summary reports are created for flight times, block times and aircraft locations; engine start and shutdown times; engine performance data under various conditions for trend monitoring; engine performance limits and exceedance reporting; standard reports for auxiliary power unit (APU) usage (cycles and running time); APU performance data for trend monitoring; and fuel usage per engine per flight, amongst others. In addition, reports may be generated for Out, Off, On, In (OOOI) times, provide operational data used for Flight Operation Quality Assurance (FOQA) programs, or to monitor specific aircraft systems for user defined limits and report exceedances.

A sample flight data report generated from data contained in an email transmission may be formatted as shown in FIG. 6. A sample engine trend data report is shown in FIG. 7.

A "create file" event may be coincidental with the monitoring mode and may be triggered immediately upon power being applied to the unit (12). A "record data" event may be the starting of the aircraft engines or another preliminary flight event. A "close file" event will cause data, either in the form of a FDR file or a summary file or both, to be written to the removable memory card. A "close file" event may be triggered by an event signaling the end of a flight such as touchdown on a runway or the shutting down of aircraft engines. Alternatively, a "close file" event may occur during a flight, either by manual selection by the aircraft crew or by ground personnel or, for example, by a set of data conditions indicating an aberrant aircraft condition. The creation and transmission of a summary file may take place at any time during a flight or at the termination of a flight, depending on the data desired.

Each of the above examples of an "event" is intended to only exemplify the application of the rules database and not to limit the possible rules and events which may be implemented in the present invention.

In one embodiment, a summary data file is a machine-readable file such as a binary file or a text file. The summary data file may be optionally encrypted using any suitable encryption method. Preferably, the summary file is readable only by unique software resident on the ground server (14), which provides an additional layer of security over and above the encryption of the file. The summary file preferably is limited to the aircraft identifier, data readings and data identifiers which may be packaged in a compact file of less than about 1 kilobyte and more preferably less than about 100 bytes. The summary file may then be incorporated into an email message, such as by attachment.

In a preferred embodiment, the data processing unit (12) includes an email client or email software which may store, send or receive emails using conventional methods over the chosen communication system. The email client may also connect with the PDA interface such that emails from the ground server (14), or from any email server connected to the ground server (14) may be relayed to the aircraft crew through the PDA. In this manner, advisories and other messages may be transmitted to the aircraft crew.

The data transmission from the data processing unit (12) is received by the satellite ground earth station (24), and routed through a gateway (26) to the ground server (14) over the Internet (28), a private computer network, a virtual private network (VPN) or over a public switched telephone network, as is well known in the art.

Figure 8:
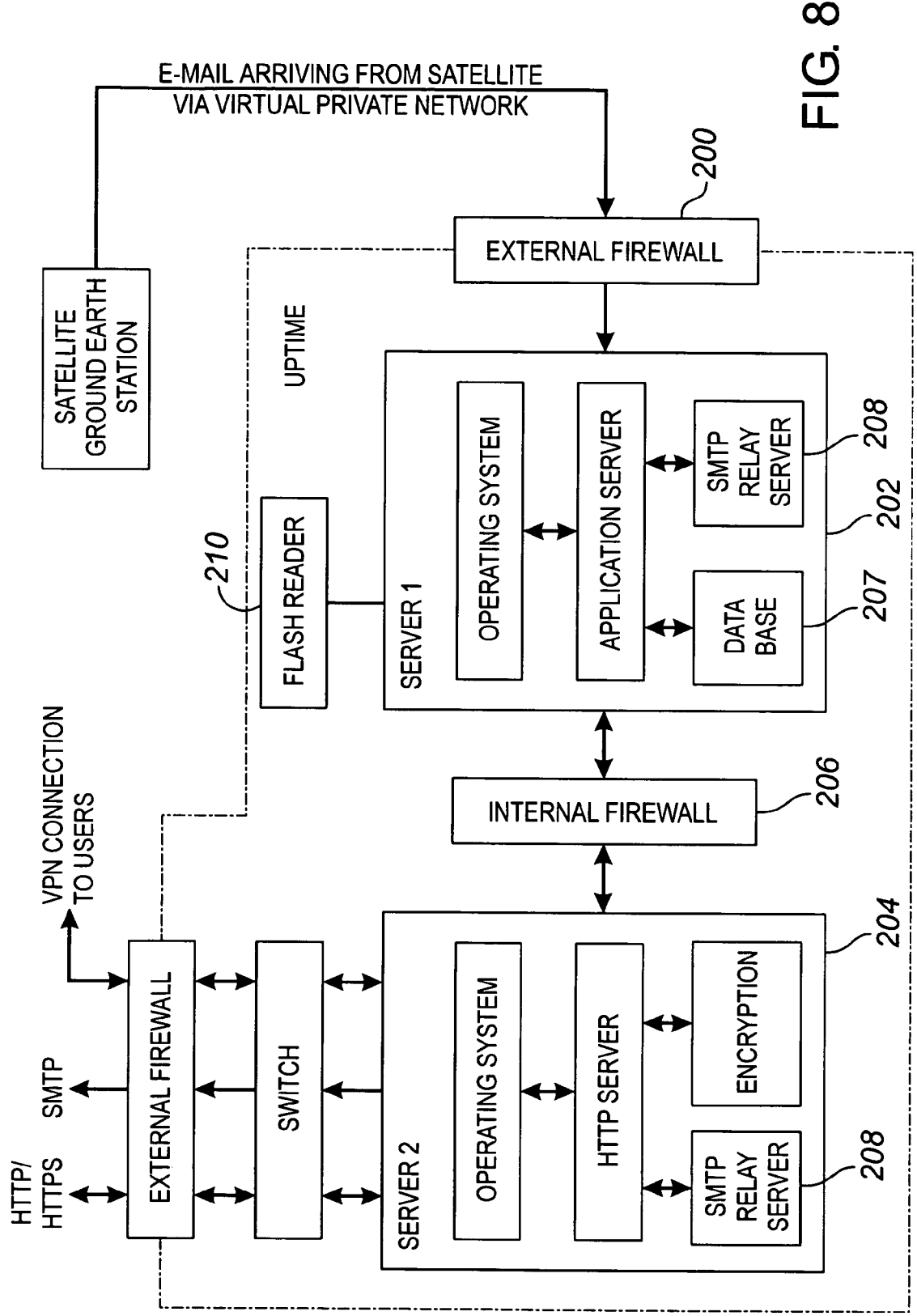
FIG. 8 is a block diagram of a ground server configuration used in one embodiment of the present invention.

FIG. 8 illustrate a block diagram of a ground server (14) in one embodiment of the invention. The email transmission from the data unit (12) is received through a firewall (200) and into a first server (202) and a second server (204) through a second, internal firewall (206). The data file, which is likely a summary file, is stripped or derived from the email and is stored in a database (207) file either before or after decryption. Application software which resides on the server, or on remote user workstations, may then be used to generate data reports from the summary data. The system may be configured to automatically generate an email including a data report to a user via a SMTP mail server (208). Alternatively, or in addition, user access to the data may be provided over the Internet (HTTP or HTTPS) or over a private network or a VPN. Of course, a memory card reader (210) may be provided to transfer data from the removeable memory card to the ground server.

As will be apparent to those skilled in the art, various modifications, adaptations and variations of the foregoing specific disclosure can be made without departing from the scope of the invention claimed herein. The various features and elements of the described invention may be combined in a manner different from the combinations described or claimed herein, without departing from the scope of the invention.

The invention claimed is:

1. An aircraft data transmission system comprising:
   (a) means for monitoring and collecting aircraft data;
   (b) means for formatting the data or a portion of the data as a binary or text file;
   (c) means for incorporating the binary or text file into an email message;
   (d) means for transmitting the email; and
   (e) communication means for carrying the email transmission to a ground station.

2. The system of claim 1 further comprising a GPS receiver.

3. The system of claim 2 wherein the communication means comprises a satellite modem and transceiver.

4. The system of claim 1 wherein the means for monitoring and collecting aircraft data comprises at least one aircraft databus interface.

5. The system of claim 4 wherein the means for monitoring and collecting aircraft data further comprises at least one discrete input interface.

6. The system of claim 1 wherein the binary or text file comprises a summary of the aircraft data or a portion of the aircraft data.

7. The system of claim 6 wherein the means for formatting the data or a portion of the data as a binary or text file comprises means for encrypting the binary or text file.

8. The system of claim 1 wherein the means for monitoring and collecting data comprises random access memory and a removeable non-volatile memory.

9. The system of claim 8 wherein the removeable non-volatile memory comprises a solid-state memory card.

10. The system of claim 1 further comprising a rules database comprising a plurality of aircraft data conditions and related actions, means for monitoring aircraft data and comparing aircraft data to the rules database.

* * * * *

(12) EX PARTE REEXAMINATION CERTIFICATE (6551st)
United States Patent
Kolb et al.

(10) Number: US 7,203,630 C1
(45) Certificate Issued: Dec. 2, 2008

(54) AIRCRAFT FLIGHT DATA MANAGEMENT SYSTEM

(75) Inventors: Kurt Kolb, Calgary (CA); Kent Jacobs, Calgary (CA); Darryl Jacobs, Calgary (CA)

(73) Assignee: Aeromechanical Services Ltd., Calgary Alberta (CA)

Reexamination Request:
No. 90/008,917, Nov. 8, 2007

Reexamination Certificate for:
Patent No.: 7,203,630
Issued: Apr. 10, 2007
Appl. No.: 10/605,962
Filed: Nov. 10, 2003

Related U.S. Application Data

(60) Provisional application No. 60/319,687, filed on Nov. 11, 2002.

(51) Int. Cl.
*G06G 7/48* (2006.01)

(52) U.S. Cl. .......................................................... 703/6
(58) Field of Classification Search .................. None
See application file for complete search history.

(56) References Cited

U.S. PATENT DOCUMENTS 7,113,852 B2 9/2006 Kapadia et al.

*Primary Examiner*—Albert W. Paladini

(57) ABSTRACT

A flight data collection and transmission system includes a data interface for receiving digital flight data, means for formatting the data as a binary or text file, means for incorporating the data file into an email, means for transmitting the email using a communication system. A method of collecting and transmitting aircraft data includes the steps of receiving and storing digital flight data, creating a data file and transmitting the data as part of an email upon the happening of a defined event.

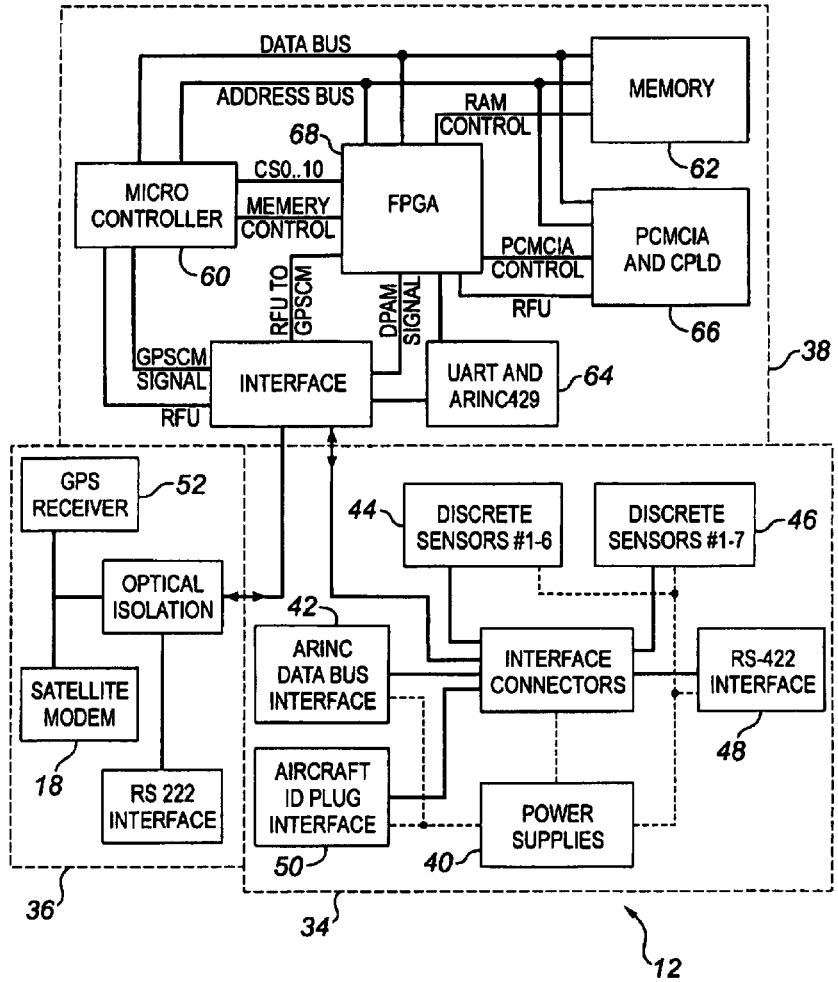

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–9 and 10 is confirmed.

* * * * *